United States Patent [19]

Eckert et al.

[11] Patent Number: 5,737,963
[45] Date of Patent: Apr. 14, 1998

[54] ULTRASONIC TRANSDUCER

[75] Inventors: Manfred Eckert, Todtnau; Karl Flögel; Rolf Schwald, both of Schopfheim, all of Germany

[73] Assignee: Endress+Hauser GmbH +Co., Maulburg, Germany

[21] Appl. No.: 721,731

[22] Filed: Sep. 27, 1996

[30] Foreign Application Priority Data

Sep. 28, 1995 [EP] European Pat. Off. .......... 95115280

[51] Int. Cl.[6] .................................................. G01F 1/66
[52] U.S. Cl. ................... 73/290 V; 73/866.5; 367/108; 367/908; 310/338
[58] Field of Search ......................... 73/290 V, 866.5, 73/632; 367/908, 188, 173, 180; 310/326, 338

[56] References Cited

U.S. PATENT DOCUMENTS

| | | | |
|---|---|---|---|
| 3,911,388 | 10/1975 | Crump et al. | 367/188 |
| 4,130,018 | 12/1978 | Adams et al. | |
| 4,359,659 | 11/1982 | Philips | 310/326 |
| 4,742,262 | 5/1988 | Ferry | 310/326 |
| 4,742,717 | 5/1988 | Ichino | 73/866.5 |
| 4,744,395 | 5/1988 | Ziegler | |
| 5,421,996 | 6/1995 | Trawoger et al. | 73/866.5 |

FOREIGN PATENT DOCUMENTS

| | | |
|---|---|---|
| 0 228 510 | 7/1987 | European Pat. Off. |
| 934312 | 10/1955 | Germany ............ 73/290 V |
| 43 11 963 | 10/1994 | Germany . |
| WO88/08605 | 11/1988 | WIPO . |

OTHER PUBLICATIONS

U.S. Application No. 08/351,389; Klofer et al.

*Primary Examiner*—Scott Cummings
*Attorney, Agent, or Firm*—Bose McKinney & Evans

[57] ABSTRACT

A small, compact, easily mountable ultrasonic transducer for measuring the filling level in a container is provided, which transducer transmits virtually no oscillation energy to the container, having a can-shaped transducer housing (1), an electronics housing (2) connected to the transducer housing (1), a transducer element (4), arranged in the transducer housing (1), for the transmission and reception of ultrasonic pulses, a union ring (3) for the sound-decoupling securing of the ultrasonic transducer on the container, in which ring the transducer housing (1) is supported coaxially with respect to the union ring (3) and is fixed therein against displacement in the axial direction, and two resilient elements (7, 8) which are arranged between the transducer housing (1) and the union ring (3) and by means of which the transducer housing (1) and the union ring (3) are held spaced apart from each other in the radial direction in such a way that there is no direct mechanical coupling between them in the radial direction.

8 Claims, 1 Drawing Sheet

ULTRASONIC TRANSDUCER

BACKGROUND OF THE INVENTION

The invention relates to an ultrasonic transducer for measuring the filling level in a container.

An ultrasonic pulse emitted from the ultrasonic transducer is reflected at the surface of the filling material. The propagation time of the ultrasonic pulse from the transducer to the surface and back is determined and the filling level is determined therefrom.

Ultrasonic transducers of this type are used in many branches of industry, for example in the water supply and water disposal sector and in chemistry.

They preferably have a small diameter, in order that the openings in the container or in a sound guide tube, in which they are to be installed, can likewise be small.

To produce the ultrasonic pulse, use is normally made of a disk-shaped piezoelectric element arranged in a can-like housing, the piezoelectric element being excited into oscillation. The bottom of the housing has the function of a diaphragm, onto which the oscillations are transmitted and through which the ultrasonic pulses are emitted.

Between the piezoelectric element and the diaphragm there is arranged a plastic layer for matching the acoustic impedance of the piezoelectric element to the acoustic impedance of the medium into which the ultrasonic pulses are to be transmitted.

A cavity which is left in the housing and is delimited by a circular surface facing away from the diaphragm and a cylindrical outer surface of the piezoelectric element is filled with a damping layer made, for example, from a plastic. This damping layer has the task of minimizing the emission of sound energy in the radial direction and in the direction facing away from the diaphragm.

The smaller are the dimensions of the piezoelectric element and hence of the ultrasonic transducer, the greater is the transmission frequency. Such an ultrasonic transducer having a transmission frequency of, for example, 50 kHz and correspondingly small dimensions is described in U.S. Pat. No. 4,130,018.

However, there is a direct mechanical coupling between the transducer element, the damping layer and the housing, with the result that the radiation of sound energy in the radial direction and in the direction facing away from the diaphragm cannot be completely suppressed. This energy is no longer available for the generation of the measurement signal.

Part of this energy is transmitted to the container. This leads, in particular in the case of metallic containers which have a very high vibration quality, to a restriction of the measurement range of the ultrasonic transducer. The duration of the ultrasonic pulse emitted is lengthened by the feeding back of the oscillation energy of the container to the transducer element. As a result, a relatively large minimum distance, referred to below as the "block distance", is required between the ultrasonic transducer and the surface of the filling material. If the surface is located within the block distance, no measurement of the filling level is possible.

DESCRIPTION OF THE PRIOR ART

In DE-A 43 11 963, an ultrasonic transducer is described for measuring a filling level in a container, having a can-shaped transducer housing, a transducer element, arranged in the transducer housing, for the transmission and reception of ultrasonic pulses, a housing completely enclosing the transducer housing as far as a bottom surface of the transducer housing, the transducer housing being fixed in the housing against displacement in the axial and radial direction by a spring claw, which is molded on the transducer housing at the end and engages in a groove in the housing, a cylindrical cavity, which is arranged between the housing and the transducer housing and encloses the transducer element coaxially, and two resilient elements which are arranged between the transducer housing and the housing and seal off the cavity at the ends.

Molded onto the housing, on that side facing away from the transducer housing bottom, is a connecting part by means of which the ultrasonic transducer is intended to be screwed into a flange. This is in turn to be fitted on an opening of a container. The ultrasonic transducer, which has a diameter which is increased by the cylindrical cavity and the housing enclosing the transducer housing, is located in the interior of the container, and the connecting part passes through the flange. The assembly of such a device is consequently complicated.

Between the housing and the bottom surface there is a gap, in which residues of the filling material can accumulate. This is in particular disadvantageous if the filling material is an aggressive material or if the ultrasonic transducer is consecutively exposed to different filling materials which, in particular, react chemically with one another.

In the case of the ultrasonic transducer according to DE-A 43 11 963, an emission of sound energy in the radial direction is very severely reduced by the cylindrical cavity. A transmission of sound energy to the container, however, also occurs via the connecting part.

SUMMARY OF THE INVENTION

It is an object of the invention to specify a small, compact, easily mountable ultrasonic transducer which can be rotated about its longitudinal axis, for measuring the filling level in a container, which transducer transmits virtually no oscillation energy to the container.

To this end, the invention comprises an ultrasonic transducer for measuring a filling level in a container, having a can-shaped transducer housing, an electronics housing connected to the transducer housing, a transducer element, arranged in the transducer housing, for the transmission and reception of ultrasonic pulses, a union ring for the sound-decoupling securing of the ultrasonic transducer on the container, in which ring the transducer housing is supported coaxially with respect to the union ring and is fixed therein against a displacement in the axial direction, and two resilient elements, which are arranged between the transducer housing and the union ring and by means of which the transducer housing and the union ring are held spaced apart from each other in the radial direction in such a way that there is no direct mechanical coupling between them in the radial direction.

According to one refinement of the invention, one open end of the transducer housing has at its open end a shoulder extending radially outward, which rests on a ledge on the interior of the union ring.

According to a further refinement of the invention, the transducer housing is fixed in the union ring by an obtuse angled circular ring segment, which is fixed in a groove arranged in the union ring, extends radially into the opening in the union ring and rests with a circular ring segment surface that faces toward the ledge on an annular surface of the shoulder of the transducer housing that faces away from the ledge, and by the shoulder of the transducer housing resting on the ledge of the union ring.

According to a refinement of the invention, the resilient elements are O rings fixed in grooves arranged in the union ring.

According to another refinement of the invention, an open end of the transducer housing has threaded holes for connecting to the electronics housing.

According to another refinement of the invention, an open end of the transducer housing has an internal thread for connecting to the electronics housing.

According to another refinement of the invention, the transducer housing is supported in the union ring such that it can rotate about its longitudinal axis.

According to a refinement of the invention, a resilient element for sound decoupling in the axial direction is arranged in a groove that is arranged in a shoulder ring which is molded on the union ring on a side facing toward the container.

BRIEF DESCRIPTION OF THE DRAWING

The invention and further advantages are explained in more detail with reference to the figures of the drawing, in which an exemplary embodiment is represented. Identical elements are provided with identical reference symbols in the figures.

DESCRIPTION OF THE PREFERRED EMBODIMENT

Figure 1:
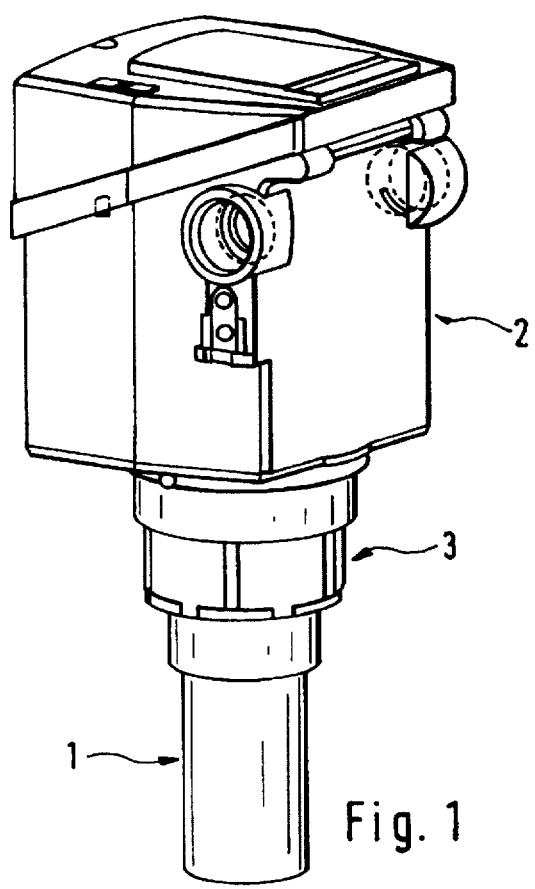
FIG. 1 shows an ultrasonic transducer.

The exemplary embodiment, represented in FIG. 1, of an ultrasonic transducer comprises three basic elements, a can-shaped transducer housing 1, an electronics housing 2 and a union ring 3. The transducer housing 1 is intended to be inserted into the union ring 3 and the electronics housing 2 is to be mounted subsequently. The ultrasonic transducer is thus of modular and compact construction.

Figure 2:
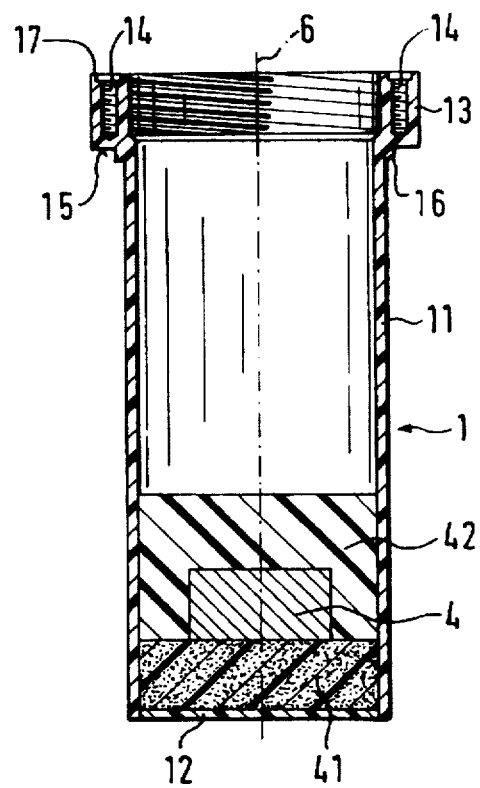
FIG. 2 shows a longitudinal section through the transducer housing of the ultrasonic transducer of FIG. 1.

FIG. 2 shows a longitudinal section through the transducer housing 1. It comprises a hollow cylinder 11, which is sealed at the end by a diaphragm 12 and consists of a plastic, preferably of a thermoplastic of high chemical resistance, for example polyvinyl chloride (PVC) or polyvinyl difluoride (PVDF).

Molded on one open end of the hollow cylinder 11 is a shoulder 13, which extends radially outward. In the exemplary embodiment shown, the electronics housing 2 is screwed to the transducer housing 1. For this purpose, the shoulder 13 has threaded holes 14.

It is equally possible for the hollow cylinder 11 to have an internal thread at its open end, into which thread the electronics housing 2 is intended to be screwed.

Molded onto the hollow cylinder 11, on an annular surface 15 of the shoulder 13 facing toward the diaphragm, is a shoulder ring 16, whose function will be explained in more detail further below.

Arranged in the transducer housing 1 is a transducer element 4, which serves alternately for the emission and for the reception of ultrasonic pulses. This is, for example, a piezoelectric element, which is excited into pulsed oscillations by an electronic circuit which is not shown in the figures. Following each emission of an ultrasonic pulse, the transducer element 4 serves as a receiving element. As a result of the ultrasonic pulse reflected at the surface of the filling material, the transducer element 4 is excited into oscillations. The resulting piezoelectric voltage is fed via connecting lines to a further electronic circuit, likewise not shown, which determines the propagation time of the ultrasonic pulse, determines therefrom the filling level and makes a signal corresponding to the filling level available for further processing and/or indication.

To match the acoustic impedance of the transducer element 4 to the acoustic impedance of the medium into which the ultrasonic pulses are to be transmitted, a matching layer 41 made of a plastic is arranged between the transducer element 4 and the diaphragm 12.

A cavity which remains in the transducer housing 1 and is delimited by a circular surface facing away from the diaphragm and a cylindrical outer surface of the transducer element 4 is filled with a damping layer 42 made of a plastic. This damping layer has the task of minimizing the emission of sound energy in the radial direction and in the direction facing away from the diaphragm.

Figure 3:
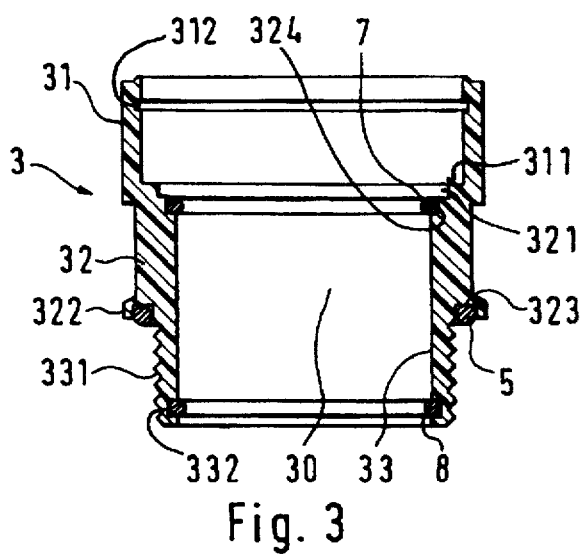
FIG. 3 shows a longitudinal section through the union ring of the ultrasonic transducer of FIG. 1.

The transducer housing I is intended to be arranged in a union ring 3, which is shown in longitudinal section in FIG. 3. The said ring comprises three portions 31, 32, 33, of which the first portion 31 has an internal diameter which is slightly greater than the external diameter of the shoulder 13 of the transducer housing 1. The second and third portions 32, 33 have in each case an internal diameter which is slightly greater than the external diameter of the hollow cylinder 11 of the transducer housing 1.

There is thus produced between the portions 31, 32 a ledge 311, on which the annular surface 15 of the transducer housing 1 rests in the assembled condition. The second portion 32 has, at that end facing the first portion 31, a recess 321 for accommodating the shoulder ring 16. The shoulder ring 16 serves to center the transducer housing 1 in the union ring 3 during assembly.

The second portion 32 has on the outside the shape of a hexagonal screw, and there is formed on the third portion 33 an external thread 331, which is intended to be screwed from the outside into an opening in the container, which opening is not shown. The ultrasonic transducer can equally well be welded into the container opening or can be fastened thereto by means of a flange. The external shape of the portion 33 is then to be constructed appropriately.

On that side facing the third portion 33, the second portion 32 has on the outside a shoulder ring 322. In the latter, on that side facing the third portion 33, there is molded a groove 323 for the accommodation of a resilient element 5, for example a seal made of an elastomer. This resilient element 5 effects decoupling of sound in the axial direction between the union ring 3 and the container.

Figure 4:
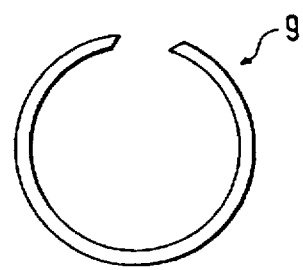
FIG. 4 shows an obtuse angled circular ring segment.

The transducer housing 1 is fixed in the axial direction in the union ring 3. For this purpose, the first portion 31 has at its end a groove 312 extending in its interior. In the assembled state, the groove 312 aligns with the side of the shoulder 13 of the transducer housing 1 facing away from the hollow cylinder. An obtuse angled circular ring segment 9, for example made of spring steel and shown in FIG. 4, is intended to be clamped into the groove 312, said circular ring segment extending radially into the interior 30 of the union ring 3 and resting with a circular ring segment surface facing toward the interior on an external annular surface 17 of the shoulder 13 of the transducer housing 1.

This fixing acts only in the axial direction. The transducer housing 1 and the electronics housing 2 which is connected thereto are thus supported in the union ring 3 such that they can rotate about a longitudinal axis 6 of the transducer housing 1.

The second and third portions 32, 33 of the union ring 3 have in each case at the end a groove 324, 332, which is arranged in their interior, for the accommodation in each case of a resilient element 7, 8. The latter are, for example, Viton O rings, Kalrez seals or polytetrafluoroethylene-encased Viton seals. Since the resilient element 8 comes into contact with the filling material of the container, it is necessary here to use a material which is matched to the filling material and which, if appropriate, has a high chemical resistance.

By means of the two resilient elements 7, 8, the transducer housing 1 and the union ring 3 are held spaced apart from each other in the radial direction in such a way that there is no direct mechanical coupling between them in the radial direction.

Along the hollow cylinder 11, in the portion delimited by the two resilient elements 7, 8, there is a tubular cavity between the transducer housing 1 and the union ring 3. In this portion, virtually no sound energy is transmitted from the transducer housing 1 to the union ring 3, since there is a considerable sound impedance step at the two interfaces between the transducer housing 1 and the cavity and between the cavity and the union ring 3.

We claim:

1. An ultrasonic transducer for measuring a filling level in a container, having
   a can-shaped transducer housing (1),
   an electronics housing (2) connected to the transducer housing (1),
   a transducer element (4), arranged in the transducer housing (1), for the transmission and reception of ultrasonic pulses,
   a union ring (3) for the sound-decoupling securing of the ultrasonic transducer on the container, the transducer housing (1) is supported coaxially with respect to the union ring (3) and is fixed therein against displacement in the axial direction, and
   two resilient elements (7, 8) which are arranged between the transducer housing (1) and the union ring (3) and provide means by which the transducer housing (1) and the union ring (3) are held spaced apart from each other in the radial direction in such a way that there is no direct mechanical coupling between them in the radial direction.

2. The ultrasonic transducer as claimed in claim 1, in which an open end of the transducer housing (1) has a shoulder (13) extending radially outward, which rests on a ledge (311) in the interior of the union ring (3).

3. The ultrasonic transducer as claimed in claim 2, in which the transducer housing (1) is fixed in the union ring (3)
   by an obtuse angled circular ring segment (9), which is fixed in a groove (312) arranged in the union ring (3); extends radially into the interior (30) of the union ring (3); and
   rests with a circular ring segment surface that faces toward the ledge on an annular surface (17) of the shoulder (13) of the transducer housing (1) that faces away from the ledge, and
   by the shoulder (13) of the transducer housing (1) resting on the ledge (311) of the union ring (3).

4. The ultrasonic transducer as claimed in claim 1, in which the resilient elements (7, 8) are O rings fixed in grooves (324, 332) arranged in the union ring (3).

5. The ultrasonic transducer as claimed in claim 1, in which an open end of the transducer housing (1) has threaded holes (14) for connecting to the electronics housing (2).

6. The ultrasonic transducer as claimed in claim 1, in which an open end of the transducer housing (1) has an internal thread for connecting to the electronics housing (2).

7. The ultrasonic transducer as claimed in claim 1, in which the transducer housing (1) is supported in the union ring (3) such that it can rotate about its longitudinal axis (6).

8. The ultrasonic transducer as claimed in claim 1, in which a resilient element (5) for sound decoupling in the axial direction is arranged in a groove (323) that is arranged in a shoulder ring (322) which is molded on the union ring (3) on a side facing toward the container.

* * * * *